(12) United States Patent
Björklund

(10) Patent No.: US 6,285,791 B1
(45) Date of Patent: Sep. 4, 2001

(54) TRANSMISSION METHOD FOR VIDEO OR MOVING PICTURES BY COMPRESSING BLOCK DIFFERENCES

(75) Inventor: Dan Björklund, Kaskinen (FI)

(73) Assignee: Telecom Finland Oy, Tele (FI)

( * ) Notice: Subject to any disclaimer, the term of this patent is extended or adjusted under 35 U.S.C. 154(b) by 0 days.

(21) Appl. No.: 08/987,360

(22) Filed: Dec. 9, 1997

Related U.S. Application Data

(60) Provisional application No. 60/032,806, filed on Dec. 9, 1996.

(51) Int. Cl.[7] .............................. G06K 9/46; H04N 7/12; H04B 1/66
(52) U.S. Cl. .............. 382/236; 375/240.24; 375/240.12; 348/412.1
(58) Field of Search ..................... 382/236, 241; 348/396, 409, 409.1, 412.1; 358/433, 261.2; 375/240.24, 240.12

(56) References Cited

U.S. PATENT DOCUMENTS

| | | | |
|---|---|---|---|
| 4,901,363 | * 2/1990 | Toyokawa | 382/56 |
| 5,295,077 | * 3/1994 | Fukuoka | 358/479 |
| 5,506,624 | * 4/1996 | Moreton | 348/420 |
| 5,543,848 | * 8/1996 | Murakami et al. | 348/416 |
| 5,566,002 | * 10/1996 | Shikakura | 358/443 |
| 5,703,966 | * 12/1997 | Astle | 382/236 |
| 5,787,199 | * 7/1998 | Lee | 382/203 |
| 5,790,265 | * 8/1998 | Shikakura | 358/443 |
| 5,835,147 | * 11/1998 | Florentin et al. | 348/416 |

* cited by examiner

Primary Examiner—Amelia M. Au
Assistant Examiner—Martin Miller
(74) Attorney, Agent, or Firm—Altera Law Group, LLC

(57) ABSTRACT

A method is disclosed for transmitting video images over a data communication network, in which method the video image is encoded at the sending end, transmitted, and decoded at the receiving end. The first frame is compressed and transmitted to the receiving end where it is stored in image memory. A copy of the first frame is retained at the transmitting end and divided into blocks. The next frame is also divided into blocks. The blocks of the first frame and the blocks of the next frame are compared to determine a block difference for each block. For each block, the difference between successive blocks is compressed and transmitted if the block difference for the block exceeds a predetermined threshold.

7 Claims, 2 Drawing Sheets

TRANSMISSION METHOD FOR VIDEO OR MOVING PICTURES BY COMPRESSING BLOCK DIFFERENCES

This application claims benefit of Provisional No. 60/032,806 filed Dec. 9, 1996.

BACKGROUND OF THE INVENTION

1. Field of the Invention

This invention relates in general to a data transmission method, and more particularly to a method for transmitting video images in a data communication network.

2. Description of Related Art

In the prior art, several methods for the transmission of video images in a data communication network are known. A feature typical of these methods is that the image is compressed in some way before transmission to allow faster transmission. Among the prior-art compression methods are, e.g., MPEG (Moving Pictures Experts Group), and H.261 and H.263 standardized by ITU (International Telecommunication Union, ITU).

The prior-art compression methods are characterized in that, instead of transmitting complete frames, only the differences between successive frames are transmitted. Moreover, predictive coding is used to reduce temporal redundancy, and modification coding to reduce spatial redundancy.

A problem with the prior-art methods is that they apply compression to entire frames and transmit all differences between successive frames. Consequently, the amount of data to be transmitted remains too high for the needs of narrow-band data communication networks. For example, if an MPEG-compressed video image with a resolution of 388*288 is transmitted over a GSM network, the transmission of a single frame may take as long as 15 seconds.

It can be seen then that there is a need for a method for processing a video image so that the image can be readily transmitted even in a narrow-band data communication network, such as a GSM network.

SUMMARY OF THE INVENTION

To overcome the limitations in the prior art described above, and to overcome other limitations that will become apparent upon reading and understanding the present specification, the present invention discloses a data transmission method.

The present invention solves the above-described problems by providing a method for processing a video image so that the image can be readily transmitted even in a narrow-band data communication network, such as a GSM network.

In the method of the present invention for the transmission of video images over a data communication network, the video image is encoded at the sending end, transmitted, and decoded at the receiving end. The equipment at the sending end comprises a reference memory, in which the first frame of the video image is stored. Next, the first frame is compressed and transmitted. At the receiving end, the frame is stored in an image memory. The first frame stored in the reference memory and the next frame in sequence are divided into blocks. Mutually corresponding blocks of the frames are compared with each other to determine a block difference. If the block difference exceeds a specified threshold, then the difference between the blocks is compressed and transmitted. In addition, the block is stored in the reference memory. At the receiving end, the difference is integrated into the image to be presented.

Other embodiments of a system in accordance with the principles of the invention may include alternative or optional additional aspects. One such aspect of the present invention is that the frame is divided into blocks having the size of 8*8 pixels.

Another aspect of the present invention is that the block difference is determined by comparing some of the mutually corresponding pixels contained in blocks corresponding to each other and calculating the number of pixels differing from each other.

Another aspect of the present invention is that the comparison of pixels is performed using some of the bits indicating pixel value.

Another aspect of the present invention is that the comparison of pixels is performed based on the luminance component of the pixels.

Another aspect of the present invention is that a predetermined pat of each frame is transmitted and integrated into the image to be presented.

Another aspect of the present invention is that the compression method used is the JPEG (Joint Photographic Experts Group, JPEG) method.

As compared with prior art, the present invention has the advantage that it allows a considerable reduction in the amount of data to be transmitted, as the frames are divided into blocks and the difference between blocks corresponding to each other is only transmitted if the block difference is sufficiently large. This makes it possible to transmit video images in a narrow-band network as well. The method is particularly well suited for the transmission of video images obtained from a mainly stationary camera, such as a monitoring camera.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method for processing a video image so that the image can be readily transmitted even in a narrow-band data communication network, such as a GSM network.

Figure 1:
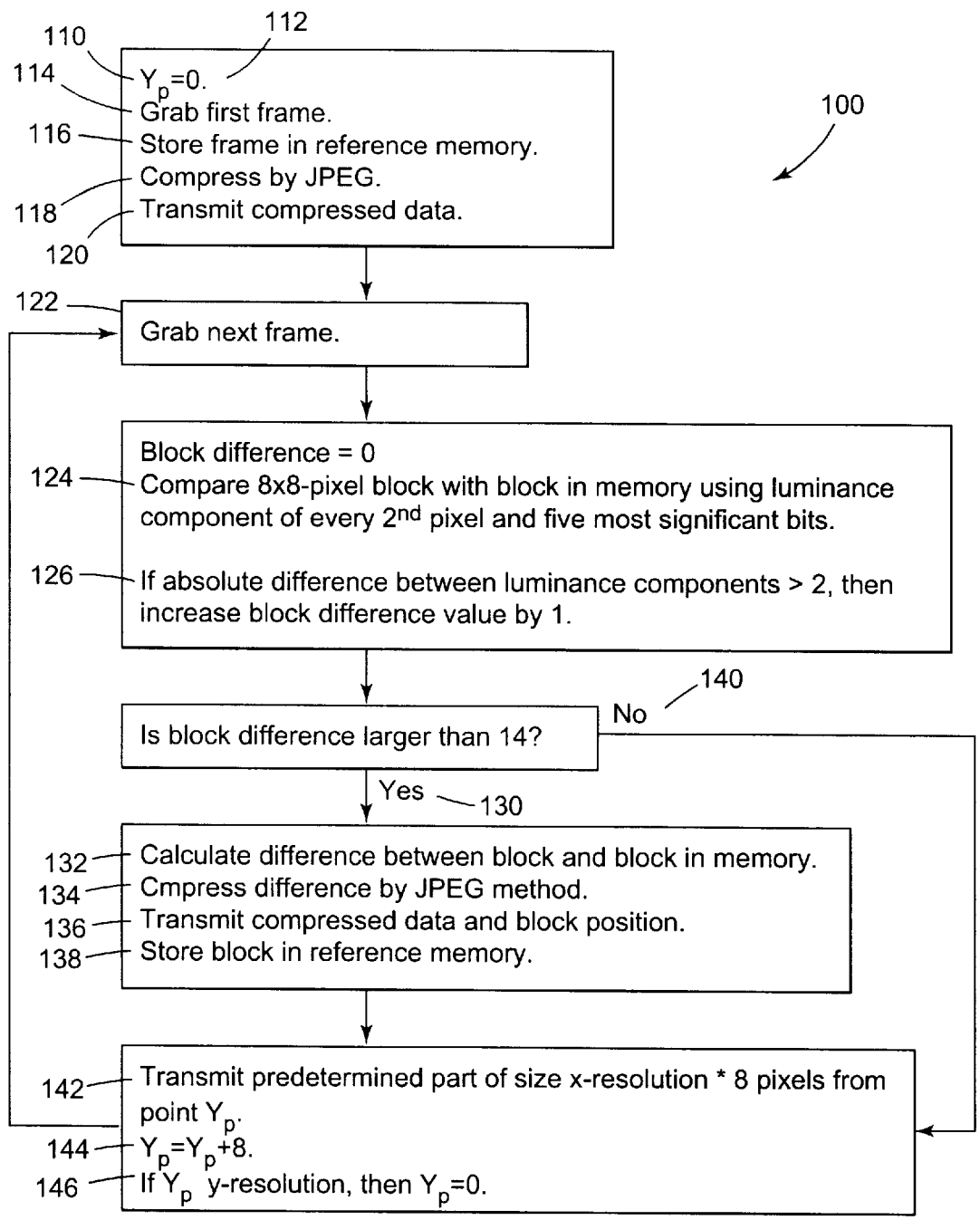
FIG. 1 presents a block diagram of the method of the invention.

FIG. 1 is a flow chart of the method of the invention. The parameter Yp 110, which indicates the value of the Y co-ordinate, is set to zero 112. The first frame of the video image is grabbed 114 and stored in the reference memory 116. The frame is compressed by the JPEG method 118 and transmitted 120. At the receiving end, the frame is decompressed, stored in the image memory and presented.

The next frame is then grabbed for comparison with the first frame 122. The frames are divided into blocks of 8*8 pixels. In blocks corresponding to each other, the luminance component of every second pixel is compared using five most significant bits 124. If the absolute difference is larger than two, then the block difference value is increased by one 126.

If a block difference value exceeding 14 is obtained 130, then the difference between the blocks being compared is large enough to be transmitted. In this case, the difference between the blocks is calculated 132, compressed by the JPEG method 134 and transmitted together with position data 136. In addition, the block under processing is stored in the reference memory 138. If a block difference value exceeding 14 is not obtained 140, steps 132–138 are skipped.

Next, a predetermined part of each frame is transmitted 142. The size of this part is x-resolution * 8 pixels. The position of the predetermined part is shifted by eight pixels downwords between successive frames, in other words the value of the parameter Yp is increased by eight for each frame until it reaches the y-resolution value 144, whereupon the parameter Yp is reset to zero 146.

Figure 2:
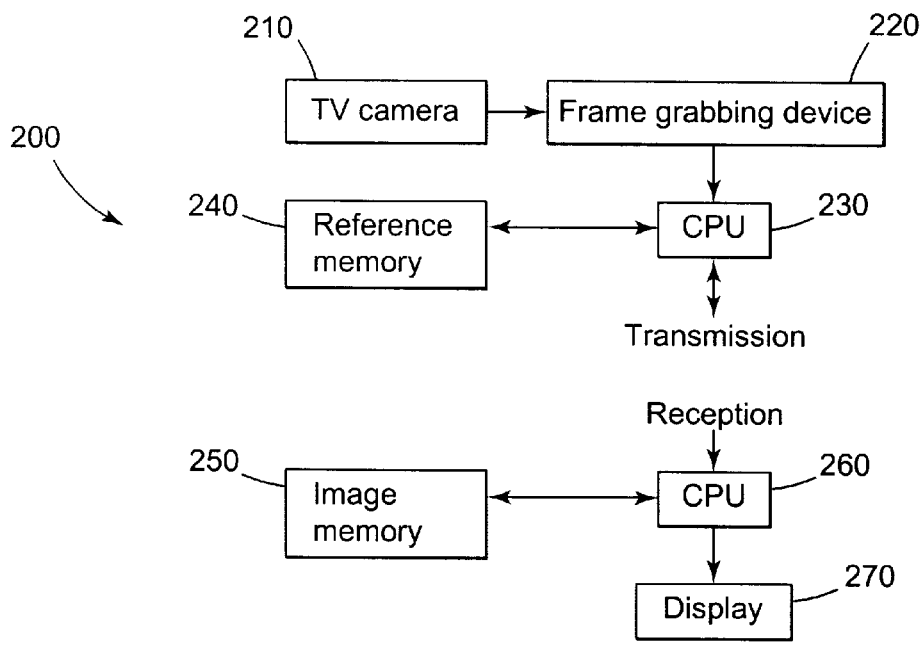
FIG. 2 presents a hardware assembly implementing the method of the invention.

FIG. 2 presents an example of a hardware assembly 200 implementing the method of the invention. Connected to a television camera, such as a monitoring camera 210, is a device 2 that grabs the frames for processing. The device 220 is further connected to a central processing unit 230, which takes care of image processing at the sending end. The central processing unit 230 communicates with a reference memory 240, which is used for the determination of block difference. The central processing unit 260 at the receiving end decodes the received data. Connected to the central processing unit 260 is an image memory 250, which is used to store the image to be presented. Moreover, the central processing unit 260 is connected to a display unit 270 used to present the image.

Figure 3:
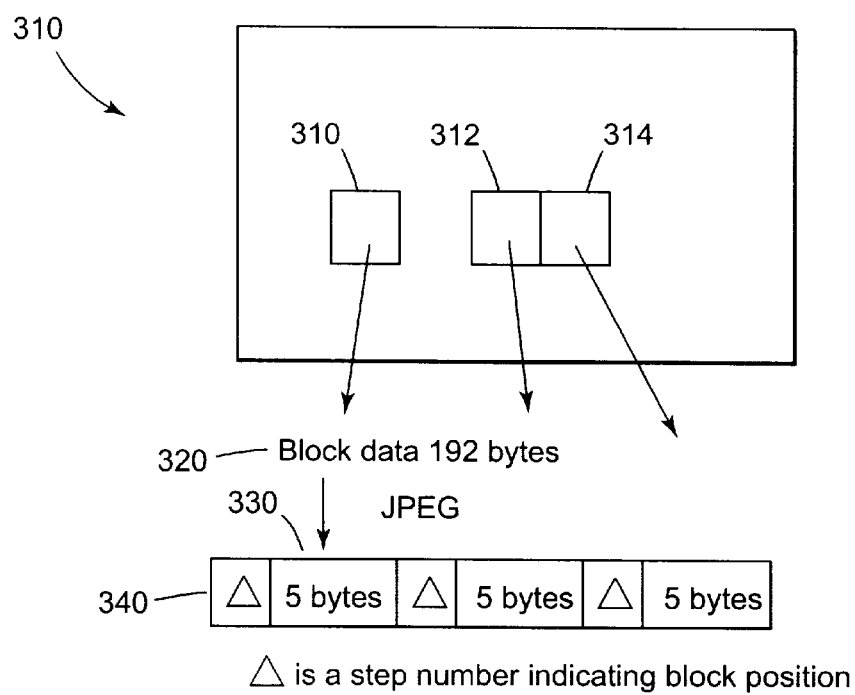
FIG. 3 presents an example of data flow transmitted by the method of the invention.

FIG. 3 presents an example 300 of the data flow to be transmitted. The frame in the example comprises three blocks 310, 312, 314 whose block differences have been found to be large enough to make it necessary to transmit the difference between successive blocks. These differences make up 192 bytes of data 320, which is compressed by the JPEG method to 5 bytes 330. In addition to the data contained in each block, the data transmitted comprises a step number delta 340, which indicates the position of each block relative to the beginning of the frame and whose value is determined as follows:

0: beginning of frame;
1–244: removed by 8 pixels; and
255: removed by 8*255 pixels from the beginning.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for transmitting video stream comprising temporally successive frames from a transmitting end to a receiving end in a data communication network, comprising:

a) storing a current frame in a reference memory provided at the transmitting end;

b) compressing said current frame;

c) transmitting the compressed current frame to the receiving end;

d) decompressing the transmitted current frame at the receiving end;

e) storing the decompressed current frame in an image memory provided at the receiving end;

f) dividing a first comparison frame into blocks, said first comparison frame being the frame currently stored in the reference memory;

g) dividing a second comparison frame into blocks, said second comparison frame being the frame temporally subsequent to the frame currently stored in the reference memory;

h) comparing the luminance components of a predetermined number of spatially corresponding pixels of a first comparison block and a second comparison block, said first comparison block being a block of the first comparison frame and said second comparison block being a block of the second comparison frame spatially corresponding to the first comparison block;

i) determining a block comparison parameter equal to the number of said compared luminance components of spatially corresponding pixels the difference between which exceeds a predetermined pixel component threshold;

j) determining a block subtraction value by subtracting each pixel of the first comparison block from a spatially corresponding pixel of the second comparison block, if the determined block comparison parameter exceeds a predetermined parameter threshold;

k) compressing the determined block subtraction value, if the determined block comparison parameter exceeds a predetermined parameter threshold;

l) transmitting the compressed block subtraction value to the receiving end, if the determined block comparison parameter exceeds a predetermined parameter threshold;

m) transmitting block position data to the receiving end indicating the spatial position of the second comparison block, if the determined block comparison parameter exceeds a predetermined parameter threshold;

n) decompressing the transmitted block subtraction value at the receiving end, if the determined block comparison parameter exceeds a predetermined parameter threshold;

o) integrating the decompressed block subtraction value into the frame stored in the image memory using the transmitted block position data, if the determined block comparison parameter exceeds a predetermined parameter threshold;

p) storing the second comparison block in the reference memory;

q) repeating steps h-p with another pair of comparison blocks spatially subsequent to the previously processed pair of comparison blocks until each block of the first comparison frame and the second comparison frame has been processed;

r) transmitting a predetermined part of the second comparison frame to the receiving end and integrating said part into the frame stored in the image memory; and s) repeating steps f-r with another frame of the video stream temporally subsequent to the previously processed frame.

2. The method of claim 1, wherein said block position data comprises a step number indicating the position of the block relative to the beginning of the frame said block is a part of.

3. The method of claim 2, wherein said predetermined part of the second comparison frame transmitted and integrated into the frame stored in the image memory comprises x-resolution * 8 pixels.

4. The method of claim 3, wherein the position of said predetermined part of the second comparison frame transmitted and integrated into the frame stored in the image memory is shifted downwards by eight pixels between successive frames.

5. The method of claim 4, wherein the step of comparing the luminance components of spatially corresponding pixels is performed by using a predetermined number of most significant bits indicating the value of said luminance component.

6. The method of claim 5, wherein said blocks comprise 8*8 pixels.

7. The method of claim 6, wherein the compression method used is the JPEG method.

* * * * *